United States Patent
McGurk et al.

(10) Patent No.: US 11,069,376 B1
(45) Date of Patent: Jul. 20, 2021

(54) WAVEGUIDE WITH OPTICAL ISOLATOR FOR HEAT-ASSISTED MAGNETIC RECORDING

(71) Applicant: Seagate Technology LLC, Fremont, CA (US)

(72) Inventors: John Bernard McGurk, Londonderry (GB); Reyad Mehfuz, Londonderry (GB); Christopher Neil Harvey, Londonderry (GB); Aidan Dominic Goggin, Donegal (IE)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/024,234

(22) Filed: Sep. 17, 2020

Related U.S. Application Data (63) Continuation of application No. 16/432,100, filed on Jun. 5, 2019, now abandoned, which is a continuation of application No. 15/901,184, filed on Feb. 21, 2018, now abandoned.

(51) Int. Cl.
| | |
|---|---|
| *G11B 11/105* | (2006.01) |
| *G11B 5/48* | (2006.01) |
| *G11B 5/60* | (2006.01) |
| *G11B 5/31* | (2006.01) |
| *G11B 13/04* | (2006.01) |
| *G02B 6/122* | (2006.01) |
| *G11B 5/00* | (2006.01) |

(52) U.S. Cl.
CPC .......... *G11B 5/4866* (2013.01); *G02B 6/1226* (2013.01); *G11B 5/314* (2013.01); *G11B 5/6088* (2013.01); *G11B 13/045* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,835,458 A | * | 11/1998 | Bischel ............... G11B 7/1245 369/44.12 |
| 6,262,949 B1 | | 7/2001 | Inoue et al. |
| 6,294,450 B1 | | 9/2001 | Chen et al. |
| 7,622,367 B1 | | 11/2009 | Nuzzo et al. |
| 7,972,875 B2 | | 7/2011 | Rogers et al. |
| 7,998,330 B2 | | 8/2011 | Fang et al. |
| 8,056,222 B2 | | 11/2011 | Pique et al. |
| 8,243,561 B2 | | 8/2012 | Matsumoto |
| 8,261,660 B2 | | 9/2012 | Menard |
| 8,333,860 B1 | | 12/2012 | Bibl et al. |
| 684,848 A1 | | 6/2013 | Gasparino |

(Continued)

OTHER PUBLICATIONS

Stadler et al., "Integrated Magneto-Optical Materials and Isolators: A Review", IEEE Photonics Journal, 2013, 16 pages.

*Primary Examiner* — Tan X Dinh
(74) *Attorney, Agent, or Firm* — Mueting Raasch Group (57) ABSTRACT

An apparatus includes a substrate. A laser is formed on a non-self supporting structure and bonded to the substrate. A waveguide having a gap portion is deposited proximate the laser. The waveguide is configured to communicate light from the laser to a near-field transducer (NFT) that directs energy resulting from plasmonic excitation to a recording medium. An optical isolator is disposed over the gap portion.

18 Claims, 7 Drawing Sheets

(56) References Cited

U.S. PATENT DOCUMENTS

| | | | |
|---|---|---|---|
| 8,456,969 B1 * | 6/2013 | Mooney | G11B 5/314 |
| | | | 369/13.33 |
| 8,501,536 B2 | 8/2013 | Mooney et al. | |
| 8,518,204 B2 | 8/2013 | Hu et al. | |
| 8,873,601 B2 | 10/2014 | Haensel et al. | |
| 8,877,561 B2 | 11/2014 | Tischler | |
| 8,885,280 B1 | 11/2014 | Huang et al. | |
| 8,923,098 B2 | 12/2014 | Jin et al. | |
| 9,105,286 B2 | 8/2015 | Boone, Jr. | |
| 9,117,940 B2 | 8/2015 | Rogers et al. | |
| 9,123,614 B2 | 9/2015 | Graff et al. | |
| 9,202,489 B2 | 12/2015 | Gokemeijer et al. | |
| 9,437,229 B2 | 9/2016 | Tatah | |
| 9,576,595 B1 * | 2/2017 | Hipwell, Jr. | G11B 5/1272 |
| 9,588,292 B2 | 3/2017 | Yu et al. | |
| 9,607,638 B1 | 3/2017 | Olson et al. | |
| 9,799,359 B1 * | 10/2017 | Olson | G11B 5/6088 |
| 10,069,029 B1 | 9/2018 | Olson et al. | |
| 10,783,917 B1 * | 9/2020 | Goggin | G11B 5/314 |
| 2007/0215480 A1 | 9/2007 | Fang et al. | |
| 2014/0355401 A1 * | 12/2014 | Huang | G11B 5/105 |
| | | | 369/13.29 |

* cited by examiner

WAVEGUIDE WITH OPTICAL ISOLATOR FOR HEAT-ASSISTED MAGNETIC RECORDING

RELATED PATENT DOCUMENTS

This application is a continuation of U.S. Ser. No. 16/432,100, filed Jun. 5, 2019, which is a continuation of U.S. Ser. No. 15/901,184, filed on Feb. 21, 2018, now abandoned, to which priority is claimed and which are incorporated herein by reference in their entireties.

SUMMARY

Embodiments described herein are directed to an apparatus comprising a substrate. A laser is formed on a non-self supporting structure and bonded to the substrate. A waveguide having a gap portion is deposited proximate the laser. The waveguide is configured to communicate light from the laser to a near-field transducer (NFT) that directs energy resulting from plasmonic excitation to a recording medium. An optical isolator is disposed over the gap portion.

Embodiments are directed to a substrate. A laser is formed on a non-self supporting structure and bonded to the substrate. A waveguide having a gap portion is deposited proximate the laser, the waveguide configured to communicate light from the laser to a near-field transducer (NFT) that directs energy resulting from plasmonic excitation to a recording medium. An optical isolator is transfer-printed over the gap portion. The optical isolator is configured to prevent light reflected back into the waveguide from reaching the laser.

Embodiments are directed to a method comprising depositing one or more cladding layers on a substrate. A waveguide having a gap portion is deposited on the one or more cladding layers. An optical isolator is disposed over the gap portion. Cladding material is deposited over the waveguide and the optical isolator.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

This disclosure relates to read/write heads used in heat-assisted magnetic recording (HAMR), also referred to as thermally-assisted recording (TAR), thermally-assisted magnetic recording (TAMR), energy-assisted magnetic recording (EAMR), etc. In this disclosure the terms "read/write head," "slider," "recording head", and "head" will be used interchangeably. In a HAMR device, a read/write head includes an energy source (e.g., a laser diode) that heats a recording medium during writing. The HAMR read/write head generally includes some form of optical transmission path, such as a waveguide and near-field transducer (NFT), which shapes and directs the energy from the energy source to the recording medium.

This disclosure describes how transfer printing may enable precise alignment of integrated photonics with other optical components of a HAMR read/write head, e.g., waveguide, laser, NFT, etc. Transfer printing generally involves transferring non-self-supporting, growth-incompatible layers to a substrate, and be referred to as transfer printing, dry transfer printing, nanoprinting, etc. The transfer printing of the optical components allows the use of materials that might not otherwise be deposited on the slider substrate, and these materials can be subsequently processed using photolithography (e.g., etching) to ensure precision alignment. This is similar to methods enabling on-wafer lasers (OWL), which involves transfer printing crystalline laser materials (e.g., epitaxial layers) to a head substrate and post-processing the layers to form an integrated laser device. The integrated-photonics-forming processes described herein can be used in combination with OWL assembly processes.

In the present disclosure, hard drive recording heads are proposed onto which a structure (e.g., photo sensors, optical isolators, photodiodes, thermo-optic sensors, modulators, absorbers, saturable transmitters) is attached without the use of a separate or intermediate support during attachment. Such structures may be incompatible with growth on the substrate, or may be print-transferred for other reasons (e.g., structures are formed using high temperature processes incompatible with slider processing). As such, the device cannot be formed using the same layer deposition processes used to form the magnetic and optical components that are integrated into the head. In embodiments described below, an integrated optics device may instead be formed on the substrate by transfer printing a thin, non-self-supporting layer, or a stack of such layers, from a growth substrate on which they were formed to a target substrate. Thereafter, the transferred layer and substrate may be further processed (e.g., masked etched, further layers added) to form the rest of the recording head.

Transfer printing the grown, partially pre-fabricated or raw materials onto surfaces that are precisely aligned to the laser output or intermediate coupler elements, and processing the elements simultaneously at a wafer level enables this alignment to much less than a wavelength. Photonic integrated circuits utilize wafer level processing, but these are typically homogenous elements (e.g., created on a single InP substrate/platform). In the present embodiments, components consisting of widely varying materials with sometimes incompatible prefabrication requirements may be precisely integrated together on a slider optical wafer platform for efficient integration with NFT elements.

Figures 1, 2, 3, 4, 5:
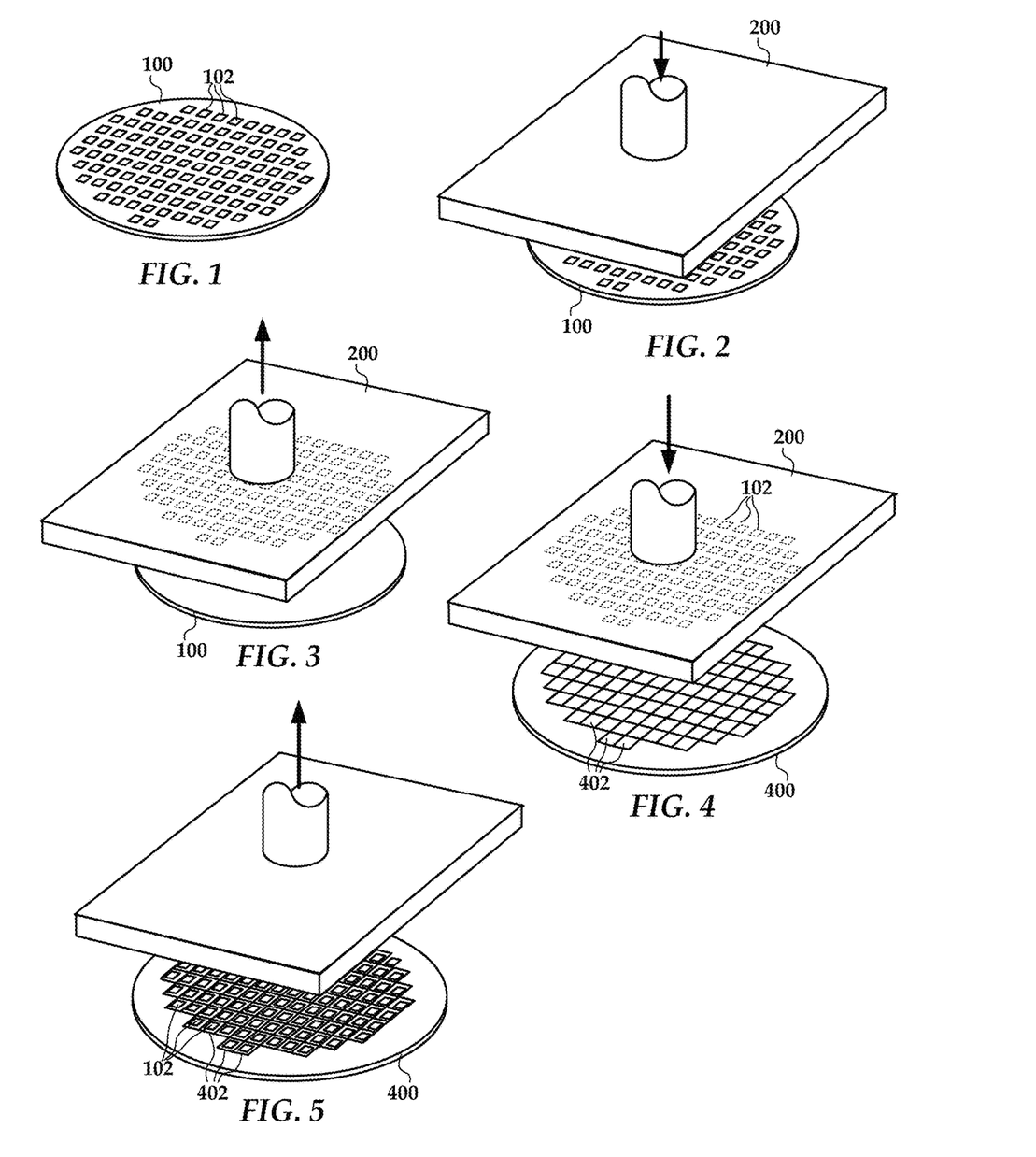
FIGS. 1-5 are diagrams showing a transfer printing process according to various embodiments described herein.

In FIGS. 1-5, block diagrams illustrate transfer printing of components onto a recording head according to an example embodiment. In FIG. 1, a donor substrate 100 includes a number of components 102 (e.g., integrated photonics devices) formed using a first process (e.g., crystalline growth, high temperature process). The components 102 may include one or more layers of materials that have been processed via photolithography and/or other processes to attain a final shape and position on the substrate 100. A sacrificial layer may also be included between the components 102 and the substrate 100 to allow separation. This fabrication could include some or all of the following: target material layer, adhesion or protection layers, carrier layers (to increase thickness for easier transport), bonding layers to aid in best print transfer, and integration layers to enable subsequent integration (e.g., stop material to allow planarization after integration).

As seen in FIG. 2, a transfer print head 200 is lowered onto the substrate material (or material stack) onto a target substrate (typically of a different material). The transfer print head 200 is lifted as shown in FIG. 3, taking the components 102 with it. In this way, "islands" of the component material are then transferred to a target substrate 400 as shown in FIGS. 4-5. As seen in FIG. 4, the transfer print head 200 is lowered over a wafer 400 that includes a number of partially-processed recording heads 402. The transfer print head 200 presses the components 102 on to the wafer 400 and is then pulled away as seen in FIG. 5. This attaches the components 102 to the recording heads 402. Afterwards, the wafer 400 is further processed, e.g., etching the components 102 to final shape and alignment, and adding additional layers of material to form additional recording head components.

Figure 6:
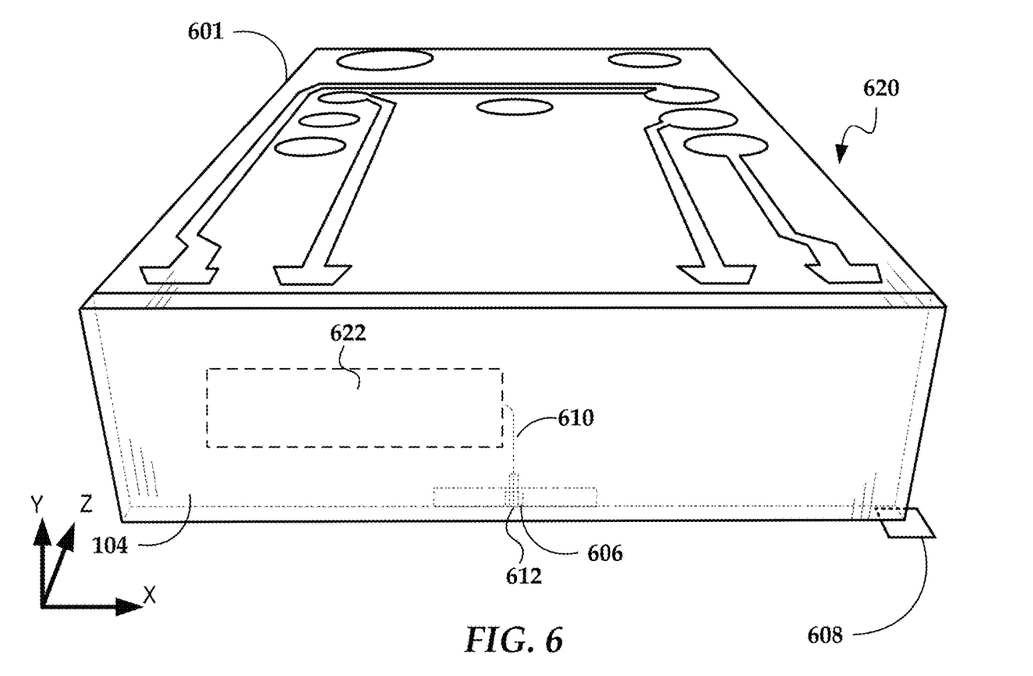
FIG. 6 shows a perspective view of a HAMR write head in accordance with embodiments described herein.

FIG. 6 shows a perspective view of a HAMR write head 620 in accordance with embodiments described herein. As described above, at least part of the laser diode 622 is not self-supporting (e.g., not a separately packaged device) but is physically transferred to a target read/write head substrate that does contain already or will contain, after further processing, the other components of the read/write head (e.g., write coil and poles, reader stack) without the use of a separate or intermediate support during attachment. The laser diode 622 delivers light to a region proximate a HAMR read/write transducer 606, which is located near the media-facing surface 608. The laser may have a TE-like output beam profile. However, TM mode may be desired for coupling with some configurations. A waveguide may provide mode order conversion rotation including a TE to TM mode. It will be understood that the embodiments below may be configured to excite other modes in some configurations.

The energy from the laser 622 is used to heat the recording media as it passes by the read/write transducer 606. Optical coupling components, such as a waveguide system 610, are formed integrally within the slider body 601 (near a trailing edge surface in this example) and function as an optical path that delivers energy from the laser diode 622 to the recording media via a NFT 612. The NFT 612 is located near the read/write transducer 606 and causes heating of the media during recording operations. The NFT 612 may be made from plasmonic materials such as gold, silver, copper, etc.

The waveguide system 610 may include a mode converter. The mode converter may be configured to convert an input mode of light into a different mode or modes of light. In some cases, the mode converter may be configured to receive a substantially transverse electric (TE) mode from the laser diode 622 and be configured to convert the light into a substantially transverse magnetic (TM) mode and/or a combined TE and TM mode. According to various embodiments, the mode converter may be configured to receive a TM mode from the laser 622 and be configured to convert the light into a substantially TE mode or a combined TE and TM mode. According to various embodiments, the mode converter may be configured to receive a combined TE and TM mode and convert the light to substantially a TE mode, substantially a TM mode, or a combined TE and TM mode having a different ratio of TE mode and TM mode light than what was input into the mode converter.

The waveguide system 610 may be surrounded by cladding layers. The waveguide system 610 and cladding layers may be made from dielectric materials such as $Al_2O_3$, $SiO_xN_y$, $SiO_2$, $Ta_2O_5$, $TiO_2$, $ZnS$, $SiN_x$, $Nb_2O_5$, $AlN$, $Hf_2O_3$, $Y_2O_3$, $AlO_x$, etc. Generally, the dielectric materials are selected so that the refractive index of at least one of the waveguide cores of the waveguide system is higher than refractive indices of the cladding layers. This arrangement of materials facilitates efficient propagation of light through the waveguide. Light is coupled from the waveguide system 610 to the NFT 612.

According to various embodiments described herein, the slider includes an optical isolator component configured to reduce and/or eliminate back reflections from the slider and/or the media. These back reflections may cause abrupt shifts in laser power output, shifts in wavelength, and/or mode hopping. Even a small change in the laser's power while recording can have significant effects on the HAMR recording process. This may cause bit error rate (BER) degradation on a written track as well as adjacent tracks on either side. In addition to changes due to environment or aging, the laser in a HAMR drive can undergo what is sometimes called a mode hop. A mode hope results in a sudden change in optical power. When the laser power increases during a write operation, for example, there is potential for BER degradation on the adjacent tracks (and possibly the next sectors on the track currently being written). When the laser power decreases there is potential for BER loss on the currently written track.

The laser may formed together with the optical isolator on the same donor substrate and transferred together, the laser may be formed on a different donor substrate and transferred during a different transfer-printing step, and/or the laser may be attached/formed using a non-transfer printing process. In some cases, the optical isolator may be formed from a thick magneto-optical film that is grown on a garnet substrate and then transfer-printed to a substrate. The magneto-optical film may comprise any magneto-optical material such as YIG, CeYIG, Bi:YIG, TIG, Bi:TIG, etc. The optical isolator may be referred to as an optical damper, optical isolator, optical stabilizer, feedback isolator, etc. The optical isolator may be configured to allow transmittal of the light from the laser but block reflections from the slider and/or the media that can cause laser instability or other negative effects (e.g., cancellation, laser intensity noise, laser mode-hopping, optical frequency spectrum disorder).

Figure 7A:
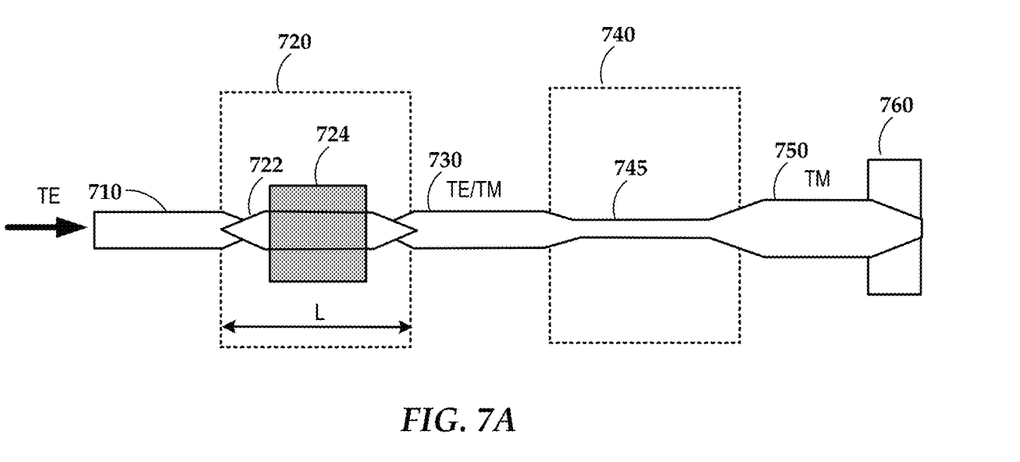
FIGS. 7A and 7B illustrate examples of a waveguide having an optical isolator in accordance with embodiments described herein.
Figure 7B:
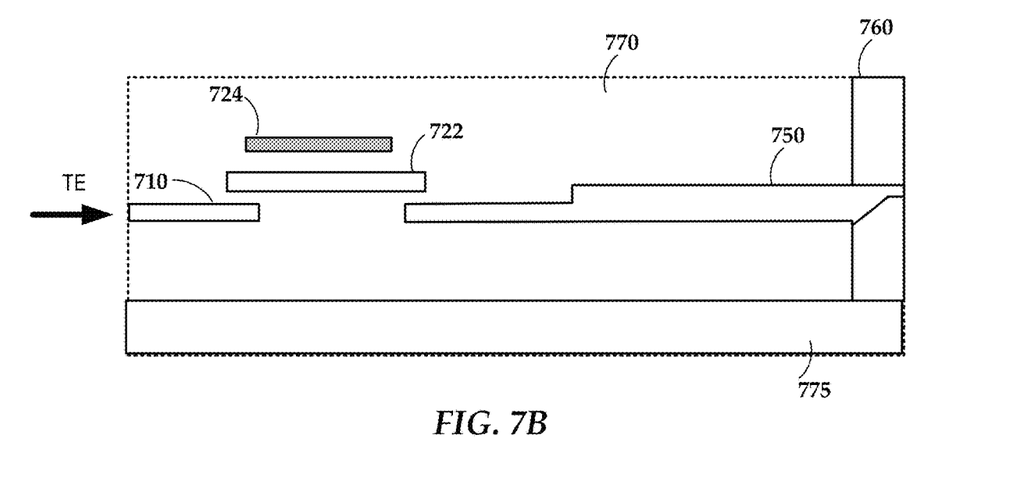

According to various embodiments, the waveguide includes an optical isolator. FIGS. 7A and 7B illustrate examples of a waveguide having an optical isolator in accordance with embodiments described herein. FIG. 7A shows a top-down view of a waveguide having an incorporated optical isolator component. Light is input into the waveguide at a first end 710. According to various embodiments, transverse electric (TE) mode light is input into the waveguide at the first end 710. An optical isolator component 720 is disposed proximate the first end 710 of the waveguide. The optical isolator component 720 comprises a magneto-optical channel 722 and a magnet 724. Light couples evanescently from the waveguide core at the input end 710 core to magneto-optical channel 722. The light then undergoes 45 degree non-reciprocal Faraday rotation and couples back to the waveguide core at a middle portion 730. Due to Faraday rotation any reflected light will have different polarization to that injected by laser. This will eliminate or reduce optical feedback. The optical isolator component has a length, L, in a range of about 40 µm to about 100 µm. In some cases, L is in a range of about 60 µm to about 80 µm. In some implementations, L is about 70 µm.

According to various embodiments, light in the middle portion 730 is mixed TE and TM mode light. The light then undergoes passive rotation via a reciprocal polarization rotator 745 at portion 740. The light is then delivered to a near field transducer 760 in a TM mode from a second end 750 of the waveguide. FIG. 7B illustrates a top-down view of the waveguide shown in FIG. 7A. As shown, waveguide core has a gap in the section in which the optical isolator is disposed. The optical isolator is disposed adjacent to the waveguide core. The waveguide core and the optical isolator component are surrounded by one or more cladding layers 770, 775.

Figure 8:
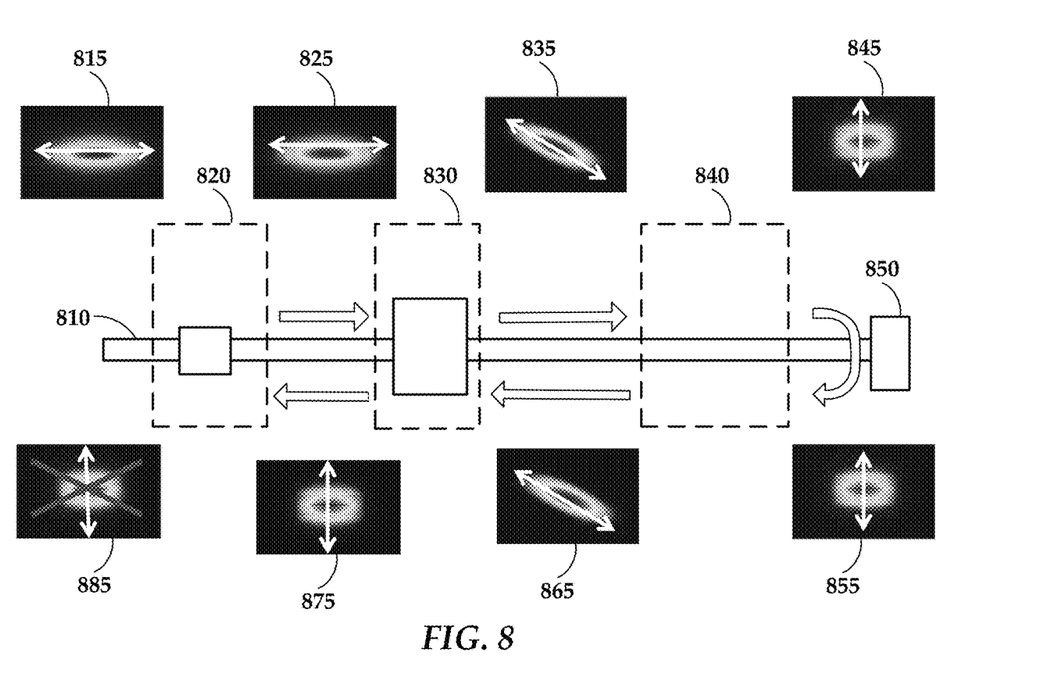
FIG. 8 shows the progression of mode conversion as light travels through the waveguide system in accordance with embodiments described herein.

FIG. 8 shows the progression of mode conversion as light travels through the waveguide system in accordance with embodiments described herein. Substantially TE mode light 815 is input into the waveguide at a first end 810. A TM mode stripper 720 is configured to cancel TM mode light from the light in the waveguide while leaving TE mode light largely unaffected. The TM mode stripper may comprise a metal block over the waveguide channel. The TM mode stripper may comprise various metallic materials such as gold, tungsten, rhodium, and/or Iridium. According to various configurations, the mode stripper may comprise a metallic material that is lossy at the operating wavelength. Because the input light is TE mode light, the TE mode light 825 continues to travel through the waveguide system and through a Faraday rotator component 830. The Faraday rotator 830 is configured to rotate the light about 45 degrees causing the light to be mixed TE mode and TM mode 835. The light then travels through a polarization rotator 840 that rotates the mixed TE/TM mode light to substantially TM mode light 845. The TM mode light 845 is then delivered to the NFT 850. In some cases, light is reflected back into the waveguide traveling an opposite direction from that of the light delivered to the NFT 850. The reflected light may be substantially TM mode light 855. The TM mode light travels through the polarization rotator 840 and is rotated to a mixed TE/TM mode light 865. The mixed TE/TM mode light 865 then travels through the Faraday rotator 830. The Faraday rotator 830 rotates the mixed TE/TM mode light 45 degrees causing the Faraday rotator 830 to output substantially TM mode light 875. This light then input into the TM mode stripper 820 that cancels out the TM mode light 885. Due to Faraday rotation any reflected light will have different polarization to that injected by laser. Therefore, substantially no TE-induced laser instability is present in the system.

Figure 9:
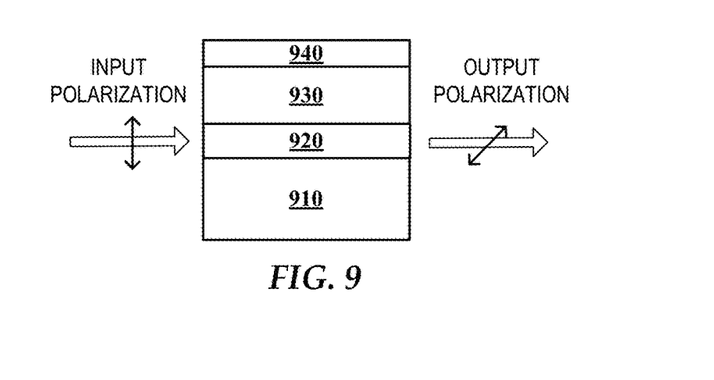
FIG. 9 illustrates a more detailed view of the elements of the Faraday rotator in accordance with embodiments described herein.

FIG. 9 illustrates a more detailed view of the elements of the Faraday rotator in accordance with embodiments described herein. A magneto-optical garnet film 920 is formed on an underlayer 910. An overlayer 930 is formed on the magneto-optical garnet film 920. The underlayer and overlayer may comprise any dielectric material such as $SiO_2$, $SiO_xN_y$, $AlO_2$, $AlO_xN_y$, $CeO_2$, $TaO_x$, $NbO_x$, etc. A magnet 940 is then formed on the overlayer 930. The Faraday rotator causes polarization of input light to rotate by 45 degrees. The amount that the light is rotated is determined by Equation 1 where θ is the rotational angle, V is the Verdet constant, B is the magnetic field, and l is the length of the Faraday rotator, e.g., the length of the magneto-optical film (L in FIG. 7A).

$$\theta = VBl \qquad \text{Equation 1}$$

According to various embodiments, V is a material property and therefore varies with the material of the Faraday rotator. In some cases, a higher V may be considered to be better than a lower V. Garnet films generally have a high V, but may have high energy processing times for crystallization, and or a high temperature deposition. The applied magnetic field, B, depends on the configuration of the system. In general, a B of about 1 T may be achieved in a HAMR system. CoPt magnets can generate about 1 T flux.

Figure 10:
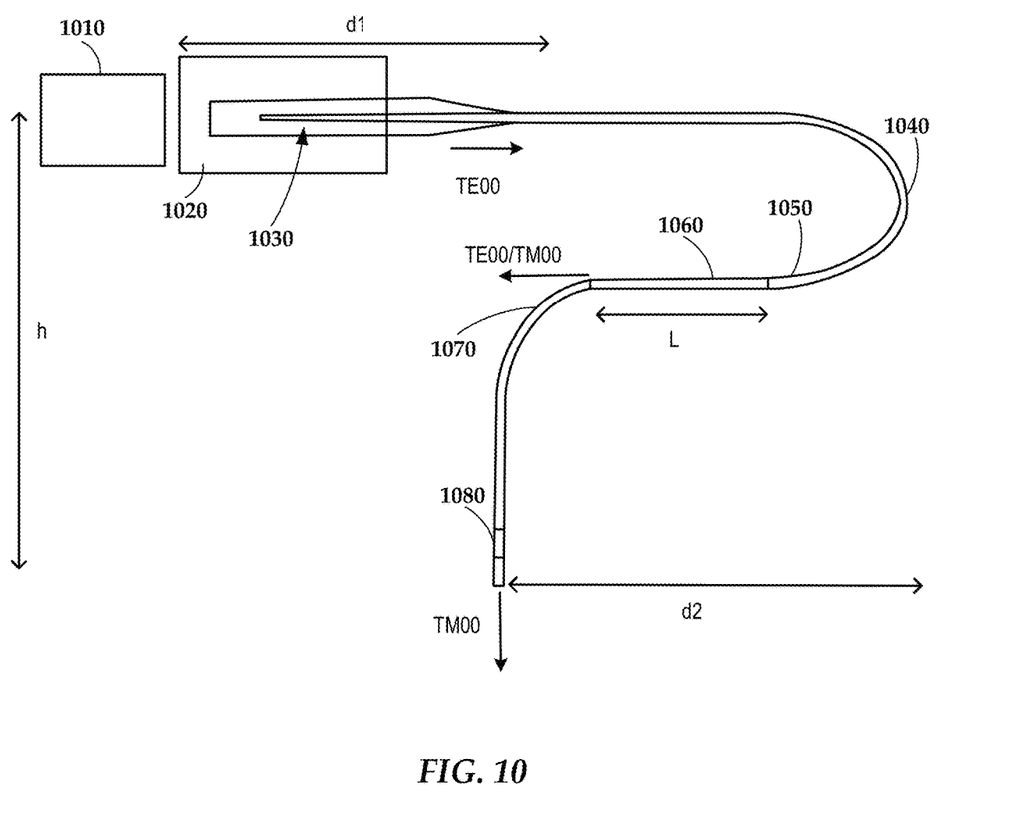
FIG. 10 illustrates another view of the waveguide system having an integrated optical isolator in accordance with embodiments described herein.

FIG. 10 illustrates another view of the waveguide system having an integrated optical isolator in accordance with embodiments described herein. Light is input into the waveguide system in a fundamental TE ($TE_{00}$) mode from laser 1010. A lens 1020 and optical coupler 1030 couple the $TE_{00}$ mode light from the laser 1010 into the waveguide core. The length of the optical coupler portion of the waveguide system, d1, may be in a range of about 100 µm to about 150 µm. In some cases, d1 is in a range of about 120 µm to about 125 µm. In some implementations, d1 is about 125 µm. The waveguide has a first turn 1040 having a bend of about 180 degrees having a bending radius in a range of about 10 µm to about 20 µm. In some cases, the bending radius of the first turn is about 15 µm. A TM mode stripper 1050 is configured to strip the TM mode light from the input light. An optical isolator 1060 rotates the mode of the light by about 45 degrees. The light output from the optical isolator is mixed TE mode light and TM mode light. For example, light output from the mode converter may be mixed $TE_{00}$ mode and fundamental magnetic ($TM_{00}$) mode light. The waveguide core has a second turn 1070 having a bend of about 90 degrees. A mode converter 1080 the mixed mode TE/TM light to substantially TM mode light before the light is delivered to the NFT. A second length, d2, represents the linear length of the waveguide between the optical coupler 1030 and the first turn 1040 and may be in a range of about 80 µm to about 130 µm. In some cases, d2 is in a range of about 100 µm to about 110 µm. In some implementations, d2 is about 105 µm.

Figure 11A:
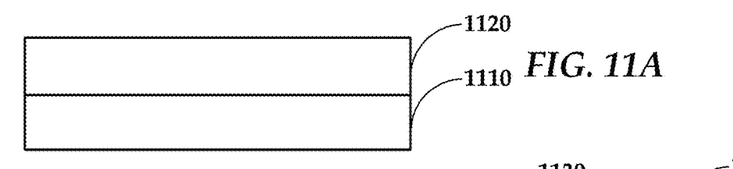
FIGS. 11A-11F illustrate a process for forming a waveguide system having an optical isolator in accordance with embodiments described herein.
Figure 11B:
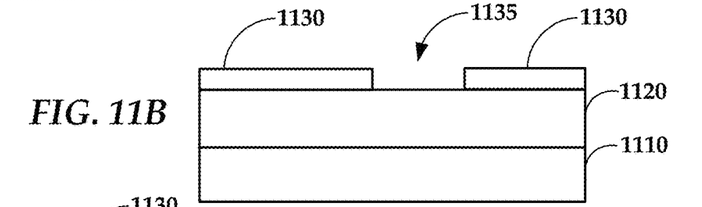
Figure 11C:
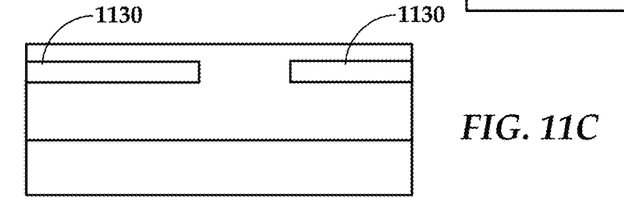
Figures 11D, 11E, 11F:
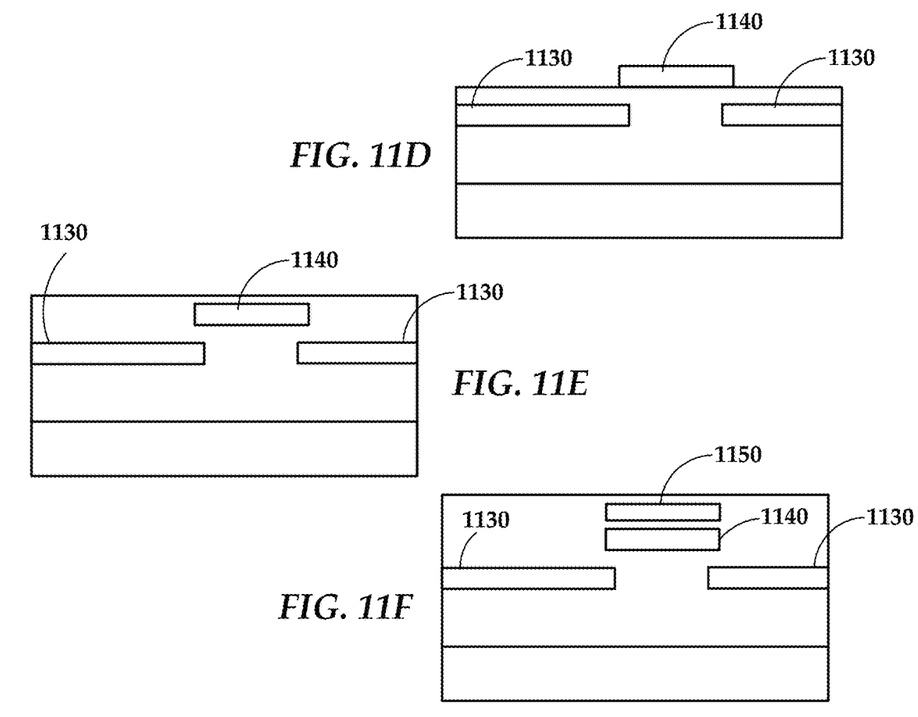

FIGS. 11A-11F illustrate a process for forming a waveguide system having an optical isolator in accordance with embodiments described herein. A first cladding layer 1110 is deposited. A second cladding layer 1120 is formed on the first cladding layer 1110. The first cladding layer may be a different material than the second cladding layer. In some cases, the first cladding layer and the second cladding layer are made of the same material. A waveguide core 1130 is deposited over the cladding layers 1110, 1120. According to various embodiments, the waveguide core 1130 is patterned. For example, the waveguide core 1130 may be patterned to have a gap 1135 as shown in FIG. 11B. Cladding material is backfilled so that it covers the waveguide core 1130 as shown in FIG. 11C. The cladding material may be the same as the cladding material of the second cladding layer 1120. For example, the cladding material may be $SiO_2$. A magneto-optical film 1140 is transfer printed over the gap 1135. In some cases, the magneto-optical film is patterned after being transfer printed. For example, the patterning process may be done by an etching, a plating, and/or a lift-off process. Cladding material is backfilled over the magneto-optical film 1140. The cladding material may be the same cladding material as that of the second cladding layer 1120. A magnet 1150 is deposited over the magneto-optical film 1140. Cladding material is backfilled over the magnet 1150. The cladding material may be the same cladding material as that of the second cladding layer 1120.

Figure 12:
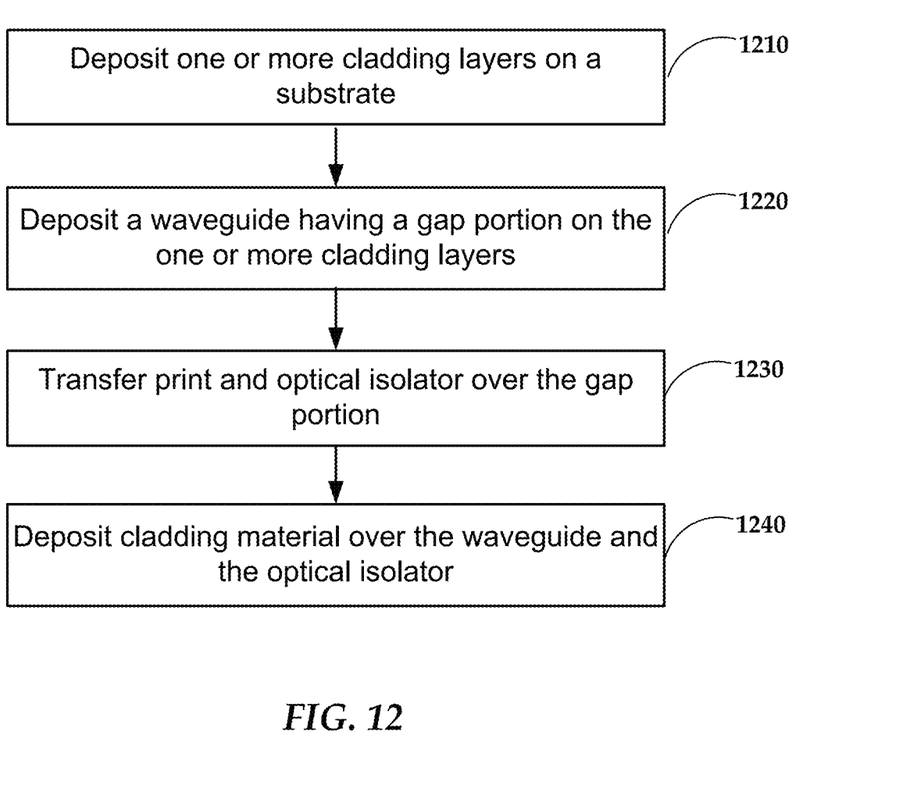
FIG. 12 is a flow diagram that describes a process of creating the waveguide system having an optical isolator in accordance with embodiments described herein.

FIG. 12 is a flow diagram that describes a process of creating the waveguide system having an optical isolator in accordance with embodiments described herein. One or more cladding layers are deposited 1210 on a substrate. A waveguide having a gap portion is deposited 1220 on the one or more cladding layers. An optical isolator is transfer printed 1230 over the gap portion of the waveguide. The optical isolator may have substantially the same length as the gap portion. In some cases, the optical isolator is wider or narrower than the gap portion of the waveguide. Cladding material is deposited 1240 over the waveguide and the optical isolator. According to various implementations, transfer printing the optical isolator comprises transfer printing a magneto-optical film over the gap portion and depositing a magnet over the magneto-optical film. In some cases, cladding material is deposited between the magneto-optical film and the magnet. According to various configurations, the magnet is deposited directly onto the magneto-optical film.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus, comprising:
   a substrate;
   a laser formed on a non-self supporting structure and bonded to the substrate;
   a waveguide having a gap portion deposited proximate the laser on the substrate, the waveguide configured to communicate light from the laser to a near-field transducer (NFT) that directs energy resulting from plasmonic excitation to a recording medium; and
   an optical isolator integrated over the gap portion.

2. The apparatus of claim 1, wherein the optical isolator comprises a magneto-optical film.

3. The apparatus of claim 2, further comprising a magnet deposited over at least a portion of the magneto-optical film.

4. The apparatus of claim 1, further comprising one or more cladding layers surrounding the waveguide and the optical isolator.

5. The apparatus of claim 1, wherein the optical isolator comprises a Faraday rotator.

6. The apparatus of claim 5, wherein the Faraday rotator is configured to rotate the light about 45 degrees.

7. The apparatus of claim 1, wherein the laser is configured to deliver a substantially transverse electric (TE) mode light to the waveguide.

8. The apparatus of claim 7, wherein the optical isolator is configured to convert light received from the laser to a combined TE and transverse magnetic (TM) mode.

9. The apparatus of claim 8, wherein the waveguide comprises a mode converter configured to convert the combined TE and TM mode light to substantially TM mode light.

10. The apparatus of claim 9, wherein the waveguide is configured to deliver the substantially TM mode light to the NFT.

11. The apparatus of claim 10, further comprising a mode stripper, wherein TM mode light reflected into the waveguide in a direction opposite the light delivered to the NFT is prevented from reaching the laser by the optical isolator and the mode stripper.

12. An apparatus, comprising:
    a substrate forming part of a slider body;
    a laser formed on a non-self supporting structure and bonded to the substrate;
    a waveguide deposited proximate the laser on the substrate, the waveguide having a gap portion within the slider body where the waveguide is configured to communicate light from the laser to a near-field transducer (NFT) that directs energy resulting from plasmonic excitation to a recording medium; and
    an optical isolator disposed over the gap portion and integrated within the slider body.

13. The apparatus of claim 12, wherein the optical isolator comprises a magneto-optical film.

14. The apparatus of claim 13, further comprising a magnet deposited over at least a portion of the magneto-optical film.

15. The apparatus of claim 12, further comprising one or more cladding layers surrounding the waveguide and the optical isolator.

16. The apparatus of claim 12, wherein the optical isolator comprises a Faraday rotator.

17. The apparatus of claim 16, wherein the Faraday rotator is configured to rotate the light about 45 degrees.

18. The apparatus of claim 12, further comprising a mode stripper, wherein TM mode light reflected into the waveguide in a direction opposite the light delivered to the NFT is prevented from reaching the laser by the optical isolator and the mode stripper.

* * * * *